Dec. 3, 1940.    R. W. JOHNSON    2,223,871
TAPER PIN
Filed Dec. 21, 1938
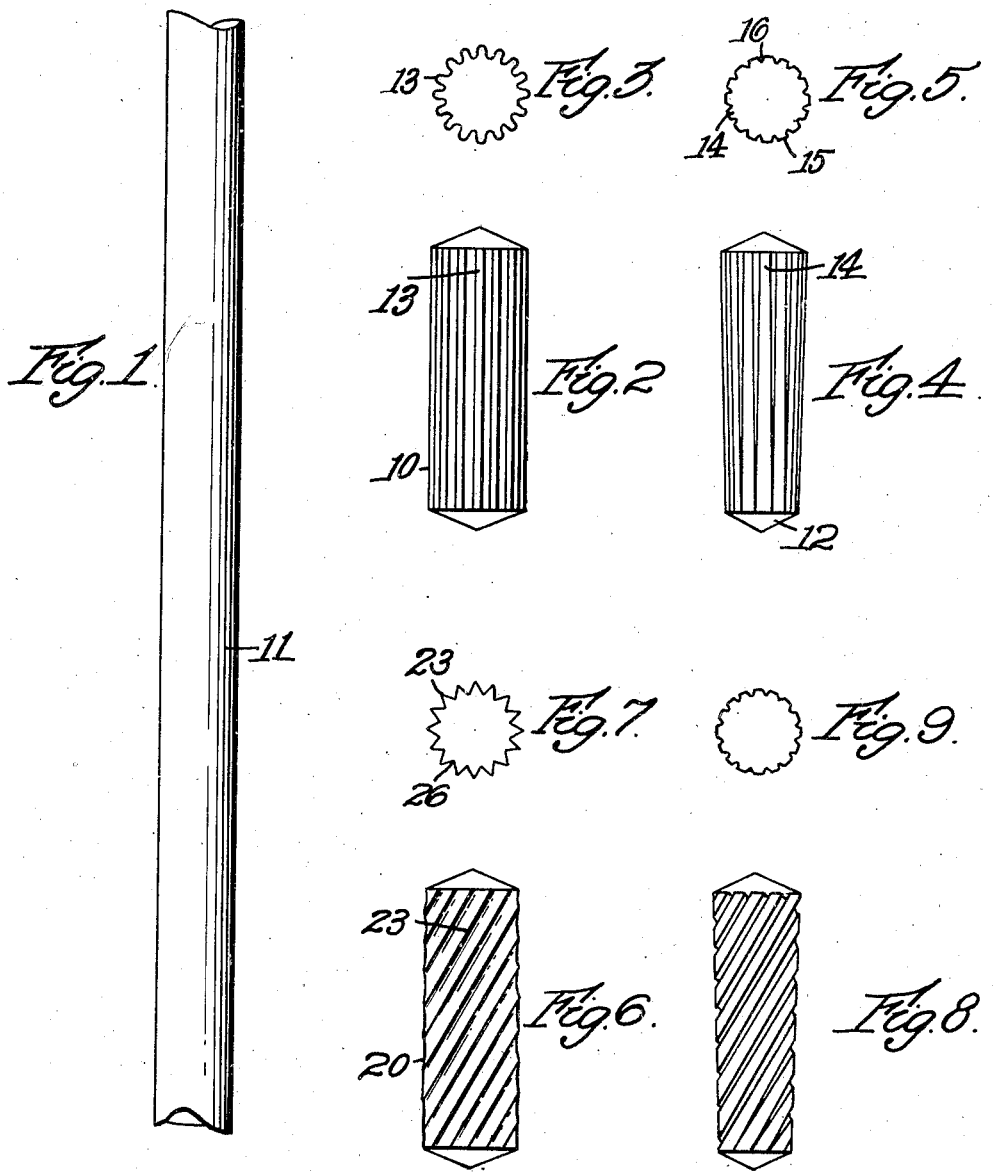
Inventor
Russell W. Johnson
By attorney Patented Dec. 3, 1940

2,223,871

UNITED STATES PATENT OFFICE 2,223,871

TAPER PIN

Russell W. Johnson, Worcester, Mass.

Application December 21, 1938, Serial No. 247,064

6 Claims. (Cl. 85—6)

The principal objects of this invention are to provide a taper pin for general use, retaining the best features of both the conventional taper pins and drive pins and removing the objections to both; to provide a taper pin in which there is no necessity of reaming a tapered hole or even tapering the hole; to provide a taper pin in which the size does not have to be controlled to the same accuracy as in the case of the pins heretofore used for this purpose and yet which will not vibrate loose; to provide a taper pin in the use of which it can be employed in a hole of the same size or slightly larger than the diameter of the small end of the pin without danger of the pin falling out in either case, or making it difficult to force the pin into the hole, if the hole is smaller; to provide a taper pin in which the pressure over the entire length of the pin properly fitted makes removal difficult; to provide a taper pin which will be easier to use for all of these reasons and because no work has to be performed on the hole in which it is to be placed, provided that hole is substantially the proper size; to provide a taper pin which will drive back out of the hole in which it is driven easier than the conventional drive pin because the pressure is relieved as soon as the pin is started back, and to provide an improved method of forming this pin by which the expense is reduced and the pin is improved.

Other objects and advantages of the invention will appear hereinafter.

Reference is to be had to the accompanying drawing, in which

Fig. 1 is a side view of a wire of circular cross section from which the pin can be made;

Fig. 2 is a side view of a blank formed from this wire which is in effect a so-called pinion wire, shown cut off to the length of the pin to be produced;

Fig. 3 is an end view of the blank shown in Fig. 2;

Fig. 4 is a side view showing the next and final step in the preparation of the taper pin;

Fig. 5 is an end view of the same;

Fig. 6 is a side view of a blank formed of the wire shown in Fig. 1 with the grooves on a helical pitch instead of straight, as in Fig. 2;

Fig. 7 is an end view of the blank shown in Fig. 6;

Fig. 8 is a side view of the completed pin formed from the blank shown in Fig. 6, and Fig. 9 is an end view of the same.

The pin, which is the subject of this invention, may be formed in either of the two ways shown in the drawing, in which the blanks 10 and 20 shown in Figs. 2 and 6 can be produced in well known ways from the smooth round wire 11. The one shown in Fig. 2 is on the market in the form of so-called "pinion wire." This pinion wire, shown cut off to the length of the desired drive pin, is rolled between two plane surfaces, not shown with an excess pressure on one end to produce a cross section as indicated in Fig. 5 of less diameter than that shown in Fig. 3. On account of the difference in pressure at the two ends a taper pin 12 is produced. This result can be obtained according to this invention by forging the blank into a conical die. Both processes involve forging.

The metal at the circumference of the teeth 13 on the blank 10 is displaced by rolling between two flat surfaces, not shown, and the diameter reduced so that in place of the gear shaped teeth 13, are the teeth 14 shown in Fig. 5, having their circumferential surfaces 15 in the arc of a circle of smaller diameter than that formed by the teeth 13. These teeth 14 have broad circular surfaces and the grooves 16 are reduced in width. The pin 12, as stated, is made slightly tapering because in rolling pressure on the lower end, Fig. 4, is greater than on the upper end.

In the form shown in Figs. 6 to 9 the blank 20 shown in Fig. 6 is formed with teeth 23 and grooves 26 arranged in a helical condition. In this case the teeth are shown as of different shape from those illustrated in Fig. 3, that is triangular in cross section, although that is not essential. The next step that is employed is to roll this blank 20 in the same way as the blank 10, so that the sharp edges of the teeth 23 are displaced in the grooves 26 and the diameter reduced. In this case, as in Fig. 4, the pressure applied is greater at one end than at the other to provide a tapering pin with the surface of the teeth at any point along the pin in a circle and of a width taking up most of the surface of the pin.

It will be seen that the method of manufacture is substantially the same in both forms and that in each form the product is made with substantial surfaces between the grooves which will grip the sides of the hole into which the pin is driven. However, the grooves are retained to cause the edges of these grooves to grip the metal and hold the pin in position so it is not likely to vibrate loose or fall out by the release of its grip.

In the conventional taper pins in use today, there is the objection to the cost of reaming a tapered hole to receive the pin and of controlling the size of the pin, both of which are entirely eliminated by this invention. In the use of the conventional drive pin the objection to controlling the size of the hole is eliminated. If the hole is of the same size or slightly larger than the pin, the pin might fall out, but in this case it is absolutely held by the relationship of the grooves to the metal between them.

In the conventional drive pin, if the hole is slightly smaller the difficulty of driving and trying to compress the metal of the pin or forcing enlargement of the hole are eliminated in this case. Also the occasional bending of the pin in driving is avoided. In this case the constant pressure along the entire length and the entire circumference of the pin when driven makes removal possible after the taper pin is once started out of the hole and the rest of the removal becomes easy. These pins may be driven into a straight hole as well as a tapered hole and the hole does not have to be kept within the close tolerances required for the conventional taper pins or drive pins because of the amount of displacement of metal which can take place on the pin or the body into which it is driven due to the grooving all around the pin. The pin resulting from this method of manufacture can be controlled as to its size to close tolerances without bothering about the exact size and shape of the holes. In this way the use of this pin is made more universal than has been the case heretofore and the use of it is broadened.

Of course, this taper pin will not readily shake loose after it is driven in because of the pressure exerted by the displaced metal and as stated it will drive out of the hole readily after it is once started back.

In the production of this pin advantage is taken of the well known fact that metal does not readily lend itself to compression but it can be displaced very easily. In this case the grooves furnish a space into which the metal of the teeth can be displaced.

Having thus described my invention and the advantages thereof, I do not wish to be limited to the details herein disclosed, otherwise than as set forth in the claims, but what I claim is:

1. As an article of manufacture, a drive pin comprising a wire having alternate grooves and teeth, the external surfaces of the teeth forming a cone and being offset into the grooves and the pin tapering from one end to the other so that the grooves are wider at one end than at the other end, and the teeth take up most of the surface of the pin at said other end.

2. As an article of manufacture, a drive pin comprising a wire having alternate longitudinal grooves and teeth all around the circumference, the external surfaces of the teeth being flattened, reduced, and offset into the grooves for substantially the length of the pin, the latter tapering from one end to the other so that the grooves are wider at one end than at the other.

3. As an article of manufacture, a drive pin comprising a wire having alternate slanting grooves and flat-topped teeth finely spaced apart and extending throughout the length of the pin, the external surfaces of the teeth being offset into the grooves and the pin tapering from one end to the other so that the grooves are wider at one end than at the other end, and the teeth take up most of the surface of the pin at said other end.

4. As an article of manufacture, a taper drive pin comprising a wire having alternate grooves and teeth, said teeth becoming gradually wider from the wide to the narrow end of the taper pin, and the grooves being comparatively wide at the wide end of the pin and becoming correspondingly narrower toward the narrow end of the pin, so that the narrow end of the pin is almost solid and has a substantially unbroken surface.

5. As an article of manufacture, a taper drive pin comprising a body having alternate grooves and teeth, said grooves being comparatively wide at the wide end of the pin and narrowing towards the narrow end of the pin, the teeth taking up most of the pin surface at this end.

6. As an article of manufacture, a taper pin comprising a body of conical contour, a series of alternate grooves and teeth on the surface of the body, said teeth being comparatively narrow and the grooves comparatively wide at the wide end of the body, and the former gradually becoming wider and the latter narrower towards the narrow end of the body, so that at this point the teeth take up almost all of the surface of the pin.

RUSSELL W. JOHNSON.